United States Patent
Grossman et al.

(10) Patent No.: US 7,370,320 B1
(45) Date of Patent: May 6, 2008

(54) SYSTEM AND METHOD FOR DEBUGGING PROGRAMS RUN IN A VARIETY OF ENVIRONMENTS

(75) Inventors: Gary Grossman, San Francisco, CA (US); Michael Schroeder, Ham Lake, MN (US)

(73) Assignee: Adobe Systems Incorporated, San Jose, CA (US)

( * ) Notice: Subject to any disclaimer, the term of this patent is extended or adjusted under 35 U.S.C. 154(b) by 681 days.

(21) Appl. No.: 10/201,055

(22) Filed: Jul. 23, 2002

Related U.S. Application Data (60) Provisional application No. 60/307,679, filed on Jul. 24, 2001.

(51) Int. Cl.
*G06F 9/44* (2006.01)
(52) U.S. Cl. .................. 717/131; 717/127; 717/121
(58) Field of Classification Search ........ 717/124–137; 714/38
See application file for complete search history.

(56) References Cited

U.S. PATENT DOCUMENTS

| | | | |
|---|---|---|---|
| 5,978,584 A * | 11/1999 | Nishibata et al. | 717/134 |
| 6,658,600 B1 * | 12/2003 | Hogdal et al. | 714/33 |
| 2002/0156881 A1 * | 10/2002 | Klopp Lemon et al. | 709/224 |
| 2004/0015940 A1 * | 1/2004 | Heisey et al. | 717/168 |

* cited by examiner

*Primary Examiner*—Tuan Dam
*Assistant Examiner*—Chuck Kendall
(74) *Attorney, Agent, or Firm*—Fish & Richardson P.C.

(57) ABSTRACT

A system and method allows a debugging tool to operate in an environment differently from an expected environment of an application being debugged, yet allows the application to be debugged in an environment in which it is expected to operate. Debugging commands are communicated to an application environment from the debugger running in a different environment and debugging information is communicated from the application environment to the debugger.

23 Claims, 4 Drawing Sheets

SYSTEM AND METHOD FOR DEBUGGING PROGRAMS RUN IN A VARIETY OF ENVIRONMENTS

RELATED APPLICATION

This application claims the benefit of U.S. provisional patent application Ser. No. 60/307,679 entitled "Method And Apparatus For Debugging Programs Run In A Variety Of Environments" filed on Jul. 24, 2001 by Gary Grossman and Michael Schroeder and is hereby incorporated by reference in its entirety.

FIELD OF THE INVENTION

The present invention is related to computer software and more specifically to graphics computer software.

BACKGROUND OF THE INVENTION

Development of application programs can involve a development stage and then a debugging stage, during which problems with the application program may be detected and/or solved. Specialized debugging tools can simplify and speed up the debugging stage of an application program. Such debugging tools can allow a user to see or even change the value of variables at certain stages of program execution so that a developer can find potential problems in the application program and attempt to solve these problems.

During the operation of the debugging tool, the application program is executed in an environment that operates identically or nearly identically to at least one environment in which the application program is expected to be operated. Identical or nearly identical operation can be important to the debugging process, because if an application runs differently on the debugger than it does in the environments in which it is expected to operate, problems with can occur in such expected environments either might not appear when the application is run by the debugger or can exhibit different behaviors in the debugger than they do in the normal operating environment of the application program, making problems reported by users of the application program more difficult to track and solve. Still other problems might appear when the application is run on the debugger may not appear in any expected operating environment, causing the developer to waste time solving problems that may never appear. This can cause the developer to lose confidence in the debugger.

When the runtime environment is the same environment in which the debugging tool operates, the debugging tool can be used to accurately operate the application program and perform certain debugging functions such as showing the value of variables, allowing the user to change the value of variables and other similar functions.

However, if the debugging tool does not operate in one or more of the environments in which an application program is expected to operate, the debugging tool can not execute the application program in its native environment, causing the difficulties described above. An example of a debugging tool that does not operate in the native environment of the application program is the conventional Flash 5 authoring tool commercially available from Macromedia, Inc., of San Francisco, Calif. Flash 5 operates in a Microsoft Windows or Apple Macintosh environment and contains a debugging tool. Flash 5 is used to develop applications for the Flash 5 player, which operates as a plug-in to a browser, such as the conventional Microsoft Internet Explorer commercially available from Microsoft Corporation of Redmond, Wash. or the Navigator program commercially available from the Netscape Corporation of Mountain View Calif. and owned by America Online of Dulles, Va. Because Flash 5 applications are executed in an environment of the browser, but the Flash 5 debugging tool operates natively under the operating system, the problems described above can result if the Flash 5 debugging tool is used to debug a Flash 5 application.

One potential solution to this problem is for the user to program the functionality of the debugger into the application program. This potential solution is suboptimal because, although the user can program some of this functionality into the application program, such programming takes time that the programmer could use to solve problems with the application program.

One potential solution to the problems that arise if the debugging tool operates in an environment that is different from the environment expected by the application program would be for the debugging tool to simulate the environment in which the application program is expected to operate. However, a simulation of this type can involve anticipating how an inordinately large number of circumstances would be anticipated by the expected operating environment of the application, a task that would be prone to inaccuracies even if it could be attempted. If there is more than one environment in which the application program being developed operates, the debugging tool would have to be able to simulate all of the environments, compounding the difficulties of simulation. Furthermore, if the environments are evolving, the debugging tool must be constantly updated to accurately simulate the ever evolving environments. These factors can make the simulation of multiple evolving environments a seemingly insurmountable task.

What is needed is a system and method that can allow a debugging tool to accurately assist with debugging an application program even if the application program operates in one or more environments that are different from the environment in which the debugging tool operates.

SUMMARY OF INVENTION

A system and method runs the application program being debugged in an environment in which it is expected to operate and reports program state information such as values of variables and hierarchical relationship information from the environment of the application program being debugged to the environment of the debugger, such as via an operating system socket. The system and method may accept commands from the debugger to control operation of the application program, such as stopping and/or starting the application program and changing one or more values of variables. Because the application program runs in its native environment, the operation accurately represents the operation of the application in the expected environments of operation and problems of simulation are avoided.

DETAILED DESCRIPTION OF A PREFERRED EMBODIMENT

Figure 1:
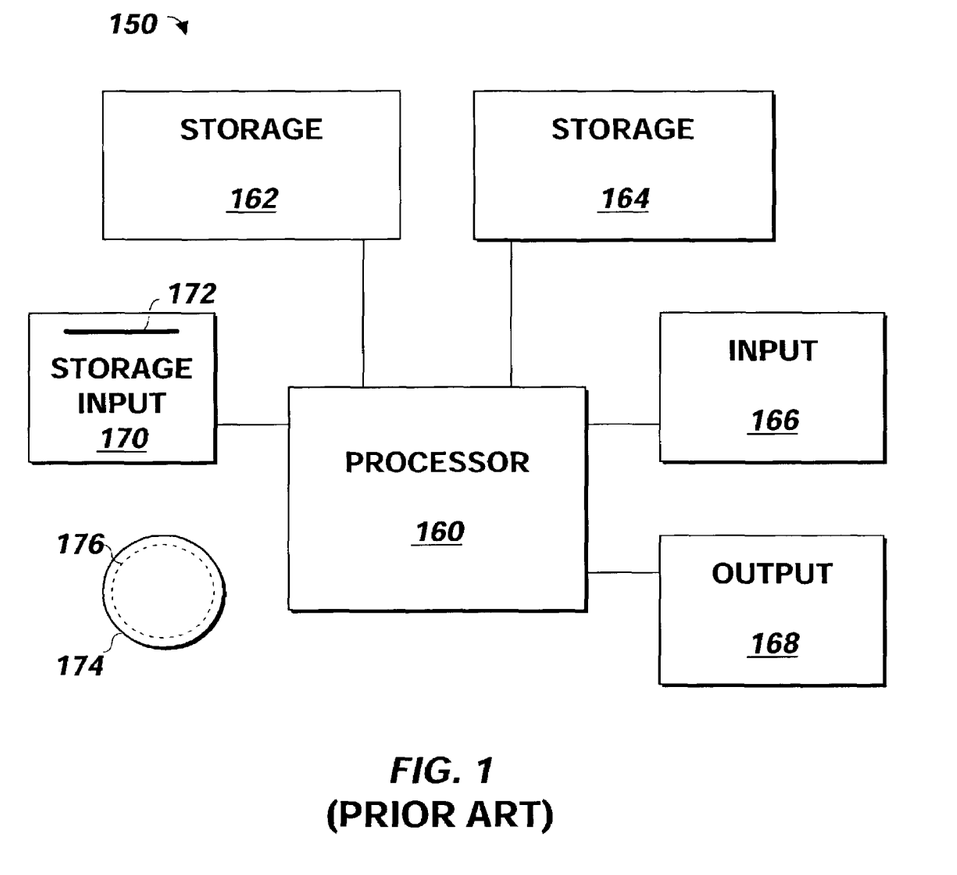
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond, Wash. or a Macintosh computer system running the MacOS, OS X or OpenStep operating system commercially available from Apple Computer Corporation of Cupertino, Calif. and the Netscape browser commercially available from Netscape Computer Corporation of Mountain View, Calif. although other systems may be used.

Figure 2:
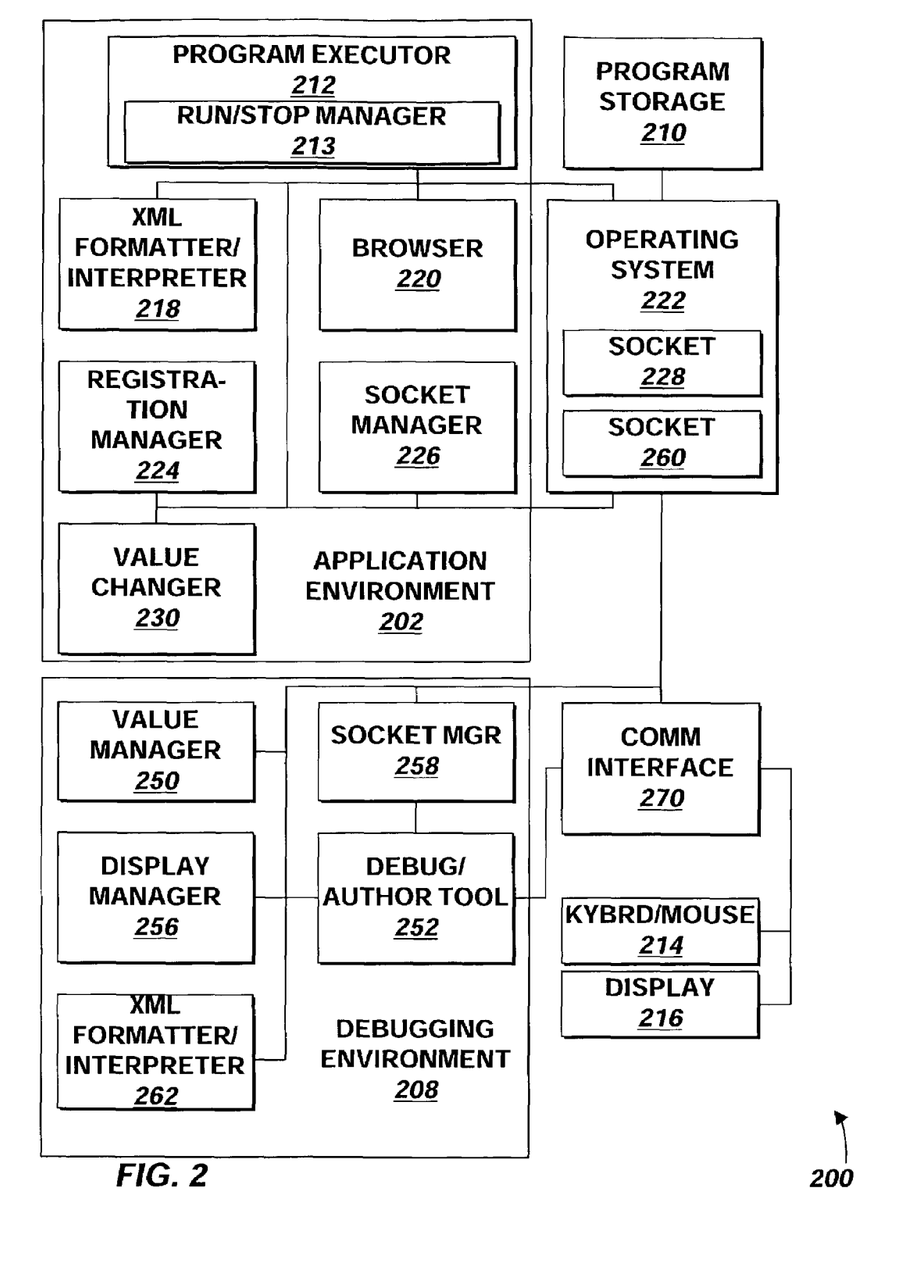
FIG. 2 is a block schematic diagram of a system for debugging an application operating in an environment different from the debugging tool according to one embodiment of the present invention.

Referring now to FIG. 2, a system for debugging an application operating in an environment different from the debugging tool is shown according to one embodiment of the present invention. In the description herein, the application being debugged is a Flash 5 movie authored by the conventional Flash 5 authoring tool commercially available from Macromedia, Inc. of San Francisco, Calif. and compiled into a conventional .swf file capable of playback by the conventional Flash 5 player commercially available from Macromedia, Inc. of San Francisco, Calif. and plugged into a conventional browser, however, in other embodiments, other applications such as other web authoring tools and runtime environments may be used, including those applications for which the tool used to debug such application runs in a different operating environment than the application. In the case of Flash 5, the application runs under a plug-in to a browser, yet the application is debugged by a debugger that runs under an operating system. In one embodiment, other examples of debugging environments that are different from the application are where a different computer system is used to debug the application than the computer used to execute the application being debugged, even though the operating environments of the two computer systems may be identical.

In one embodiment, a Flash 5 movie is contained in a movie file that is defined by an author and served to a user, for example over an Internet connection, although other delivery methods may be used, such as via a file available to the computer system being used to debug the application, either from a diskette, disk or network connection. The movie file contains images, audio and instructions that describe how the images and audio are displayed to form the movie. The images and audio are rendered to a user by a Flash Player into a form that may be perceived by a user according to the instructions.

In one embodiment, a movie may be built from one or more movie clips. Movie clips may be thought of as a section of a movie. Movie clips may be nested so that a movie clip could be built from one or more other movie clips. The structure of such a movie may be represented as a tree, with a clip containing other clips represented as the parent of the other clips, and the other clips as siblings of each other.

In one embodiment each movie clip is arranged as a sequence of frames that are played to the user in the same manner that a conventional film strip contains individual frames. Instructions in the movie clip describe which images or audio are to be included into each frame of the movie clip, and how the movie clip itself is to be displayed.

When authoring a movie, the author supplies graphics, audio, and an authoring file, which is a program that contains instructions describing how the graphics and audio are to be rendered and combined to form each movie clip, and how the movie clips are to be rendered to form the movie to be played by a player. The program contains variables that refer to the placement and size of various objects in the frame, the volume of the audio, attributes (such as transparency) of various objects, and other parameters that control how the movie is displayed. In one embodiment the movie file is a Macromedia Flash .swf file, although other embodiments may use other file formats. The format of a .swf file can be downloaded from http://www.macromedia.com/software/flash/open/licensing/fileformat/.

In one embodiment, there are two environments used by the present invention. An application environment 202 may include the environment in which the application being debugged operates. A development environment 208 may include the environment running the debugger and may contain a development environment where the application is authored. In one embodiment, development environment 208 and application environment 202 are resident on the same computer system. In another embodiment development environment 208 and application environment 202 are on separate computer systems connected by a computer network. In one embodiment the network is the Internet, although other embodiments may use other networks. Although not indicated by the Figure, operating system 222 is a part of both environments 202, 208.

In one embodiment, an author controls system 208 via communication interface 270. Communication interface 270 is a conventional communications interface to a conventional keyboard and mouse 214, display 216, printer, diskette drive, or other conventional input or output device of a conventional computer system (not shown). In one embodiment, all communication into and out of system 200 is made via communication interface 270.

In one embodiment, application environment 202 includes registration manager 224. Registration manager 224 includes a program that registers program executor 212 as a plug in to browser 220. During the registration process, registration manager 224 instructs browser 220 to register to operating system 222 that browser 220 can operate applications with filenames having extensions that end with extensions of the filenames of files being debugged, which in one embodiment, are .swf files. Browser 220 registers itself with operating system 222 as capable of executing files having the file extension or extensions provided by registration manager 224 and registers program executor 212 to itself so that when it receives such files from the operating system, it transfers control to program executor 212 which uses browser 220 to execute the application as described in more detail below. In one embodiment, registration manager 224 also instructs browser 220 to register program executor 212 as capable of executing files having a MIME type or types of the files being debugged, which in one embodiment are "application/x-shockwave-flash" and "application/futuresplash" and browser 220 registers such mime types and program executor 212 with itself. In one embodiment, registration manager 224 includes a conventional Flash plug-in installation program and program executor 212 includes the conventional Flash player, although other arrangements may be used by the present invention.

In one embodiment, the user starts the debugging process by using keyboard/mouse 214 to inform debugging/authoring tool 252 via communications interface 270 of the name and location of a file containing the program being debugged by entering a command, clicking an icon, or other conventional method of communicating with a computer application. In one embodiment, debugging/authoring tool 252 includes the conventional Flash 5 authoring tool, described in Ulrich, "Flash 5 for Windows and Macintosh" (2001, Peachpit Press, Berkeley, Calif. ISBN0-201-71614-3) and in the help files of Flash 5, and these references are hereby incorporated herein in their entirety.

Debugging/authoring tool 252 initiates a communications session with application environment 202. In one embodiment, debugging/authoring tool 252 initiates communications by signaling socket manager 258 to open a socket 260. In such embodiment, debugging/authoring tool 252 provides to operating system a predefined set of parameters to use for the communications session, such as protocol and port number. Debugging/authoring tool 252 optionally copies the indicated file to program storage 210, and signals operating system 222 to execute the indicated file.

Operating system 222 determines that the indicated file is executed using browser 220 by examining its filename extension as described above, so operating system 222 signals browser 220 to begin execution of the program in the file. Browser 220 then passes the program in the file to program executor 212.

Program executor 212 checks to see if a debug flag is set. In one embodiment, the debug flag may be set within the file at the time debugging/authoring tool 252 determines whether to copy the file to program storage 210 as described above. In another embodiment, the user indicates that the flag should be set by using keyboard/mouse 214 to inform program executor 212 via communications interface 270 by entering a command, clicking a check-box, or other conventional method of communicating with a computer application.

If program executor 212 determines that the debug flag is set, then program executor 212 initiates a communications session with debugging environment 208. In one embodiment program executor 212 initiates communications by signaling socket manager 226 to open a communications session such as a socket 228, using the same port and protocol used by debugging/authoring tool 252. Once the communication session is set up, application environment 202 and debugging environment 208 can communicate with one another using conventional TCP/IP protocols, or other conventional protocols using sockets 260, 228.

In one embodiment, program executor 212 begins executing the program in the file. As it executes, it provides the name and values of variables as values are assigned to variables so that they may be viewed by debugging/authoring tool 252. Program executor 212 provides the names and values of variables using any of various methods, two of which will now be described.

In one embodiment program/executor 212 examines each instruction of the file as it executes, looking for operations that change the values of variables such as assignment instructions. When such an instruction is found, program executor 212 executes the instruction and sends the changed variable's name and new value to XML formatter/interpreter 218.

In another embodiment program executor 212 or debugging/authoring tool 252 modifies the file during or after it is copied to program storage 210 in such a way that when the file is executed by program executor 212, all variable assignments cause the variable names and new values to be sent to XML formatter/interpreter 218. This may be accomplished by scanning the instructions in the program and inserting an instruction into the file after each assignment instruction. The inserted instruction outputs the name of the variable assigned and its new value to XML formatter/interpreter 218. Program executor 212 can thus execute the program normally, with names and values of variables sent to XML formatter/interpreter 218 as they are assigned.

In one embodiment, a variable name provided with the value by program executor 212 as described above includes an identifier of the movie clip and even the method that is the parent of the variable. In one embodiment, an instance identifier of the movie clip is also provided with the variable.

In a similar manner, program executor 212 also provides description of hierarchies of the program to XML formatter/interpreter 218. As described above, a movie clip may contain other movie clips as children of the first movie clip, and so the parent-child relationship information is provided by program executor 212. As with the values and names of variables, there are many ways of causing program executor 212 to provide this information, two of which will now be described.

In one embodiment, as program executor 212 examines each instruction of the file as it executes, program executor 212 looks for instructions that cause a new instance of a movie or of a movie clip to be shown. When such an instruction is found, program executor 212 sends the name of the new movie or clip and the name of the parent of the movie clip to XML formatter/interpreter 218.

In another embodiment program executor 212 or debugging/authoring tool 252 modifies the file during or after it is copied to program storage 210 in such a way that when the file is executed by program executor 212, all instructions that cause a new instance of a movie clip to be shown cause the name of the new movie clip and the name of the parent of the movie clip to be sent to XML formatter/interpreter 218. Although movie clip relationship information is described herein as being provided, in other embodiments, any other relationship information or information about the structure of the program being debugged may be provided by the present invention.

XML formatter/interpreter 218 receives the names and values of changed variables as well as the movie clip relationship information as described above, and formats this information by tagging it using conventional XML formatting techniques. For example, if a movie clip entitled "The Chase" that was a child movie clip of a "Main" movie clip, and had a variable named "foo" that was assigned a new value of "7", the generated XML (without the DTD statement) might look like:

```
<movie clip>
    <Title>Main</title>
    <movie clip>
        <title>The Chase</title>
        <variable>
            <name>foo</name>
            <value>7</value>
        </variable>
    </movie clip>
</movie clip>
```

XML formatter/interpreter 218 sends this tagged information to socket 228 via socket manager 226. Socket 228 receives it and sends it to socket 260, which receives it and sends it to XML formatter/interpreter 262 in debugging environment 208. XML formatter/interpreter 262 receives the tagged information, formats it for output, and sends the formatted information to display manager 256, which displays the information on display 266 as described in more detail below. In one embodiment a commercially available browser is used in place of XML formatter/interpreter 262 and display manager 256.

In one embodiment, display manager 256 displays each instance of a movie clip in one window using a hierarchical display arrangement matching the hierarchical movie clip information received from XML formatter/interpreter 262 to illustrate the relationship of the movie clip to the other movie clips in the movie program. If the user clicks on a movie clip, display manager 256 displays in a different window the values of all variables having names that include movie clip or instance names matching that instance of the movie clip.

In one embodiment, a user can use display manager 256 to designate a certain variable to be on a watch list by clicking and dragging the displayed variable name to an icon on the display or by right clicking the variable and selecting an "add watch" menu item from the menu that appears. This selection operation may be repeated by the user as often as desired for any number of variables. When display manager 256 receives variables corresponding to variables on the watch list, it displays them in a tabbed window within the second window described above so that the user can monitor several variables from various movies and clips simultaneously.

In one embodiment while the movie is playing the author can instruct debugging/authoring tool 252 to stop the movie. In such embodiment the user enters a command, clicks on an icon, or other conventional method of communicating with a computer application via keyboard/mouse 214 and communication interface 270. Communication interface 270 sends the "stop" command to debugging/authoring tool 252, which receives it and signals socket manager 258 to send a "stop" command to run/stop manager 213 of program executor 212 via socket manager 258 and sockets 260 and 228. Run/stop manager 213 receives the command and instructs program executor 212 to stop executing the file.

In one embodiment, any commands sent from debugging environment 208 to application environment 202 are formatted and interpreted using XML, and so these commands, such as the stop command are sent via XML formatter/interpreter 262 (which formats the command) and XML formatter/interpreter 218 (which interprets the command) in a manner similar to that described above.

In one embodiment, run/stop manager 213 stops program executor 212 execution by clearing a "run" flag, which is initially set during program executor 212 initialization. In one embodiment, program executor 212 checks this flag after displaying each frame or a different type of a set of instructions, and continues on with execution of the next frame or set of instructions only if the flag is set.

In another embodiment, during or after the file has been copied to program storage 210 debugging/authoring tool 252 or program executor 212 adds into the program file instructions to continue operation of the program only if the run flag is set every several instructions, otherwise, operation is suspended and program state is preserved and run stop manager 213 receives control of the operation of program executor. This embodiment allows the interruption of operation of the program without altering program executor 212. Run/stop manager 213 may stop program executor 212 by clearing the "run" flag as described above.

In one embodiment, while the application is stopped, the user can adjust from debugging/authoring tool 252 the value of variables being used by the program. In such embodiment the user enters a command, clicks on an icon, or other conventional method of communicating with a computer application via keyboard/mouse 214 and communications interface 270. Communications interface 270 sends the "change variables" command to value manager 250, which prompts and receives via communications interface 270 the names of one or more variables to change and their new values. Value manager 250 provides the names and values it receives to value changer 230 via socket manager 258, and sockets 260 and 228. In one embodiment, this information is communicated using XML via XML formatter/interpreter 262 in debugging environment 208 and XML interpreter 218 in application environment 202 in a manner similar to that described above. Value changer 230 receives the "change variables" command and change information, and makes the requested changes.

In one embodiment, value changer 230 may communicate directly with program executor 212 via an application programming interface. In such embodiment value changer 230 may make calls to the API to request the variable changes.

In one embodiment value changer 230 may examine a map of computer system memory and compute the location of variables managed by program executor 212. Value changer 230 may then alter computer system memory directly to effect the variable changes.

In one embodiment, the user can restart a stopped application. In such embodiment the user enters a command, clicks on an icon, or other conventional method of communicating with a computer application via keyboard/mouse 214 and communications interface 270. Communications interface 270 sends the "resume" command to debugging/authoring tool 252, which receives it and sends a "resume" command to run/stop manager 213 via socket manager 258 and sockets 260 and 228. Run/stop manager 213 receives the "resume" command and passes it to program executor 212, which resumes execution.

In one embodiment, run/stop manager 213 resumes program executor 212 execution by setting the "run" flag and signaling program executor 212 to restart.

In one embodiment, when program executor 212 detects that the "run" flag is cleared, program executor executes a "spin loop", continually testing the "run" flag after a short delay. In such embodiment, the loop continues as long as the "run" flag is cleared, and normal execution resumes as soon as run/stop manager 213 sets the flag.

In one embodiment application environment 202 and debugging environment 208 are on separate computer systems connected by a computer network and using two different operating systems. In one embodiment the network is the Internet, although other embodiments may use other networks. A user may indicate to a forwarder (not shown) on each computer system the address of the other computer system, to allow communications between the computer systems in the manner that communication between application environment 202 and debugging environment 208 is performed.

Figure 3A:
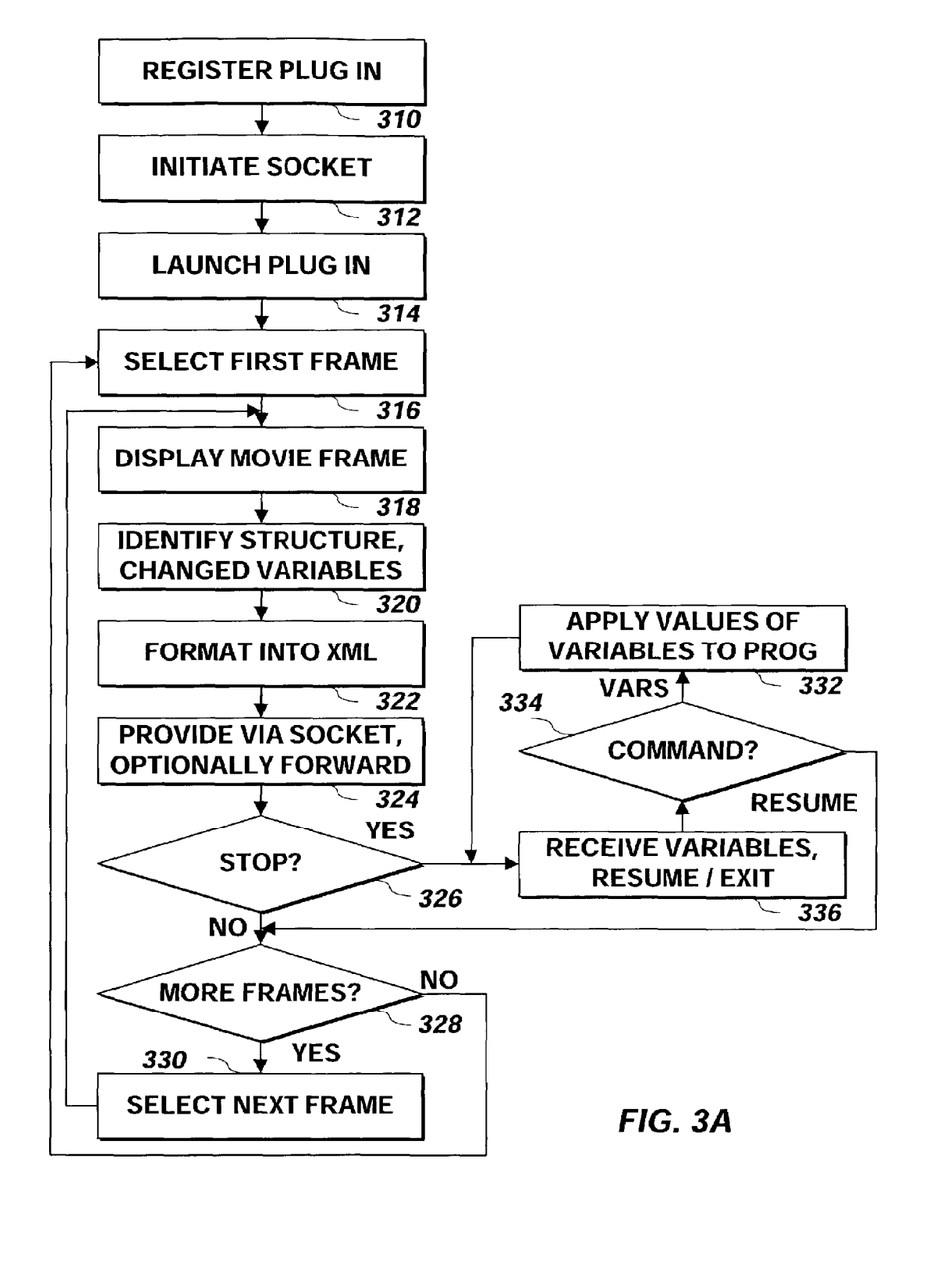
FIG. 3A is a flowchart illustrating a method of receiving debugging commands and providing debugging information according to one embodiment of the present invention.

Referring now to FIG. 3A, a method of receiving debugging commands and providing debugging information is shown according to one embodiment of the present invention. A command to register a plugin is received 310 as described above. It isn't necessary to register the plug in each time the method is implemented, because once registered, the registration information may be preserved. A socket is initiated 312 and the plugin launched 314, as described above. The first frame of the movie program is selected 316 and displayed 318, as described above. The first frame of the movie may include the first frame of one or more movie clips.

If any movie variables or structures have changed 320, then the names and values and relationship information is formatted 322 using XML or another formatting capability and sent 324 via socket to the development environment as described above. If a stop command was received 326, then any commands or changed variables are received 336 as described above and the method continues at step 334, and otherwise 326, the method continues at step 328. If the command received was "change variables" 334, the names and values of variables are received and applied 332 as described above, and the method continues at step 336. If the command received in 336 was "resume", then the method continues at step 328.

At step 328, a check is made 328 for more frames to display or other portions of the program to execute as described above. If more frames or portions are available 328, then the next frame or portion is selected 330 as described above and the method continues at step 318. If there are no more frames available 328, then the method continues at step 316.

Figure 3B:
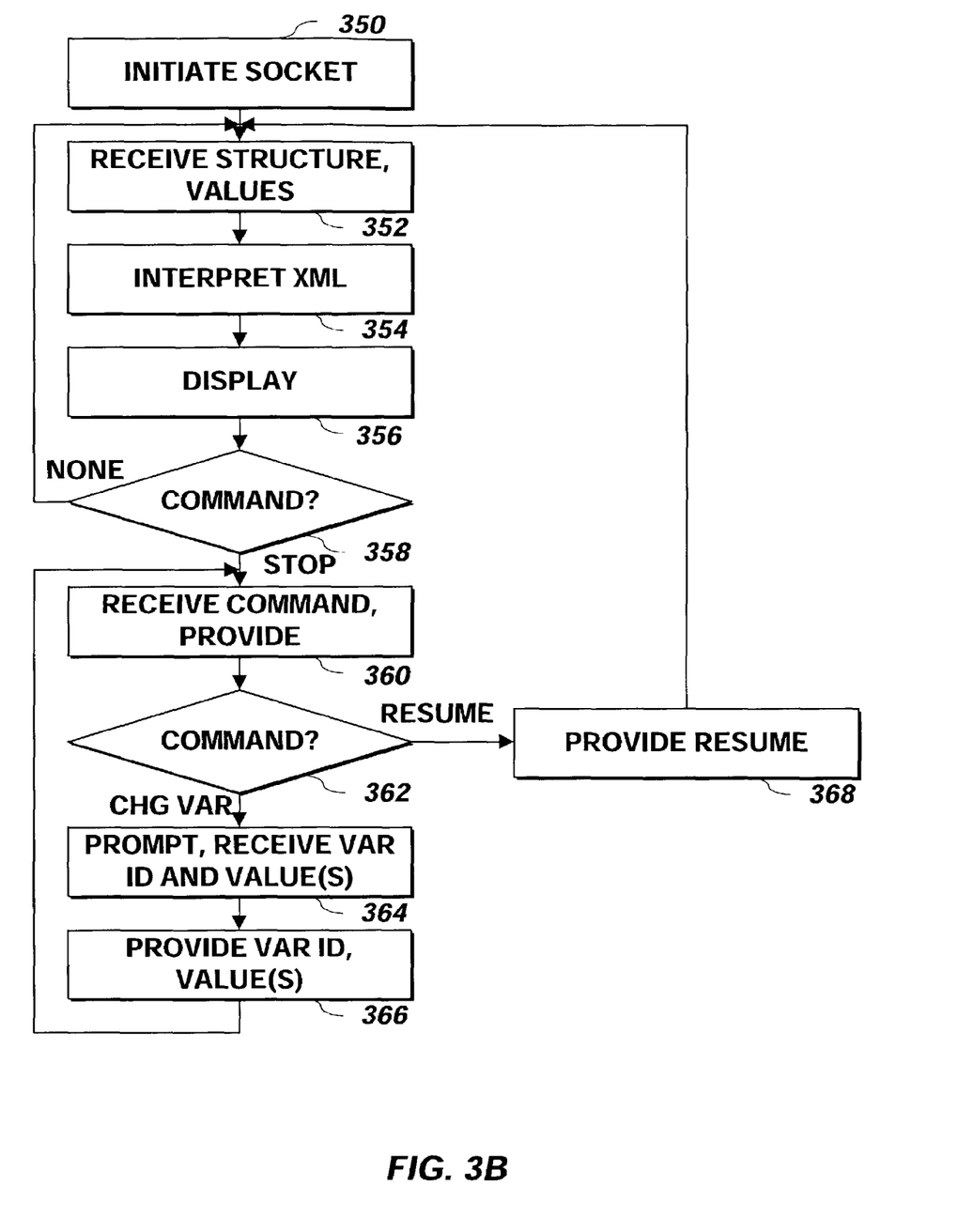
FIG. 3B is a flowchart illustrating a method of receiving debugging commands and providing debugging information according to one embodiment of the present invention.

Referring now to FIG. 3B, a method of providing debugging commands and receiving and displaying debugging information is shown according to one embodiment of the present invention. A socket is initialized 350 and monitored as described above. Variables and program structure information tagged with XML are received 352 on the socket as described above. This information is interpreted 354 and displayed 356 as described above.

If a "stop" command is received as described above, then the method continues at step 360. If not, the method continues at step 352.

At step 360, a command is received 360 as described above. If the command is "resume" 362, then a signal is sent 368 to resume operation of the application being debugged as described above and the method continues at step 352. If the command is "change variables" 362, then the variable names and values are optionally prompted for and are received 364 and sent 366 to the application being debugged as described above and the method continues at step 360.

What is claimed is:

1. A method of executing a plurality of instructions, the method comprising:
   receiving the plurality of instructions;
   executing at least one of the plurality of instructions in a first environment;
   during the execution of the at least one of the plurality of instructions, reporting from the first environment via a communication link to a program operating in a second environment, different from the first environment, state information about said executing of said plurality of instructions;
   registering, at least an executor of the at least one of a plurality of instructions to the first environment, wherein the first environment is not an operating system; and
   receiving, in conjunction with the plurality of instructions, animation information on which at least one of the plurality of instructions operates.

2. The method of claim 1 wherein:
   the first environment comprises a browser; and
   the executing step is performed by a plug-in to the browser.

3. The method of claim 2 additionally comprising adding at least one instruction useful for the providing state information step, to the plurality of instructions prior to execution of at least one of the plurality of instructions, responsive to at least one of the plurality of instructions.

4. The method of claim 3 wherein the adding step is performed in the second environment.

5. The method of claim 2 wherein the reporting step comprises placing said state information into a format.

6. The method of claim 5 wherein the format comprises XML.

7. The method of claim 1 wherein the state information comprises a value of at least one variable and instance information.

8. The method of claim 1, additionally comprising, during said executing step:
   receiving at the first environment a command in a format of XML from the second environment to suspend execution; and
   responsive to said command, suspending the executing step before all of the instructions in the plurality of instructions have been executed.

9. A system for executing a plurality of instructions, the system comprising:
   a program executor in a first environment having an input for receiving the plurality of instructions, the program executor for executing at least one of the plurality of instructions and for, during said executing, providing at an output state information about said executing of said plurality of instructions;
   a display manager operating in a second environment, different from the first environment, having an input coupled to the program executor output for receiving the information and displaying it to a user;

a registration manager for registering at least the program executor to the first environment, wherein the first environment is not an operating system; and wherein the program executor additionally receives in conjunction with the plurality of instructions at the program executor input animation information on which at least one of the plurality of instructions operates.

10. The system of claim 9 wherein:
the first environment comprises a browser; and
the program executor comprises a plug-in to the browser.

11. The system of claim 10, wherein at least one selected from:
program executor is additionally for adding at least one instruction to the plurality of instructions prior to execution of at least one of the plurality of instructions, responsive to at least one of the plurality of instructions; and
the system additionally comprises a debug/authoring tool operating in the second environment, the debug/authoring tool having an input coupled for receiving the plurality of instructions, the debug/authoring tool for adding at least one instruction to the plurality of instructions prior to execution of at least one of the plurality of instructions, responsive to at least one of the plurality of instructions, said at least one instruction added being useful for providing the state information.

12. The system of claim 10 additionally comprising a formatter having an input coupled to the program executor output and an output coupled to the display manager input, the formatter for receiving the state information at the formatter input, placing said state information into a format and providing the formatted state information at the formatter output.

13. The system of claim 12 wherein the format comprises XML.

14. The system of claim 9 wherein the state information comprises a value of at least one variable and instance information.

15. The system of claim 9 wherein the program executor additionally comprises a run stop manager having an input for receiving at the first environment a command in a format of XML from the second environment to suspend execution, the run stop manager for providing at an output an indication to stop execution to program executor at a program executor run/stop input; and
program executor is additionally for, responsive to said indication, suspending the executing step before all of the instructions in the plurality of instructions have been executed.

16. A computer program product comprising a computer useable medium having computer readable program code embodied therein for executing a plurality of instructions, the computer program product comprising computer readable program code devices configured to cause a computer system to:

receive the plurality of instructions;
execute at least one of the plurality of instructions in a first environment;
during the execution of the at least one of the plurality of instructions, report from the first environment via a communication link to a program operating in a second environment, different from the first environment, state information about said executing of said plurality of instructions;
register, at least an executor of the at least one of a plurality of instructions to the first environment, wherein the first environment is different from an operating system; and
receive, in conjunction with the plurality of instructions, animation information on which at least one of the plurality of instructions operates.

17. The computer program product of claim 16 wherein:
the first environment comprises a browser; and
the computer readable program code devices configured to cause the computer system to execute comprise a plug-in to the browser.

18. The computer program product of claim 17 additionally comprising computer readable program code devices configured to cause the computer system to add at least one instruction useful for the providing state information step, to the plurality of instructions prior to execution of at least one of the plurality of instructions, responsive to at least one of the plurality of instructions.

19. The computer program product of claim 18 wherein the computer readable program code devices configured to cause the computer system to add are intended for performance in the second environment.

20. The computer program product of claim 17 wherein the computer readable program code devices configured to cause the computer system to report comprise computer readable program code devices configured to cause the computer system to place said state information into a format.

21. The computer program product of claim 20 wherein the format comprises XML.

22. The computer program product of claim 16 wherein the state information comprises a value of at least one variable and instance information.

23. The computer program product of claim 16, additionally comprising, computer readable program code devices configured to cause the computer system to, during the performance of the computer readable program code devices configured to cause the computer system to execute:
receive at the first environment a command in a format of XML from the second environment to suspend execution; and
responsive to said command, suspend the executing step before all of the instructions in the plurality of instructions have been executed.

* * * * *

UNITED STATES PATENT AND TRADEMARK OFFICE
CERTIFICATE OF CORRECTION

| | | |
|---|---|---|
| PATENT NO. | : 7,370,320 B1 | Page 1 of 1 |
| APPLICATION NO. | : 10/201055 | |
| DATED | : May 6, 2008 | |
| INVENTOR(S) | : Gary Grossman and Michael Schroeder | |

It is certified that error appears in the above-identified patent and that said Letters Patent is hereby corrected as shown below:

Claim 16:
    column 11, line 52:
        delete "useable", and replace with --usable-- column 12, line 12:
        delete "different from", and replace with --not--

Signed and Sealed this

Fourteenth Day of April, 2009

JOHN DOLL
*Acting Director of the United States Patent and Trademark Office*